UNITED STATES PATENT OFFICE.

GEORGE B. DODGE, OF BOSTON, MASSACHUSETTS.

EMBALMING COMPOUND.

No. 814,775.

Specification of Letters Patent.

Patented March 13, 1906.

Application filed November 11, 1904. Serial No. 232,342.

*To all whom it may concern:*

Be it known that I, GEORGE B. DODGE, a citizen of the United States, residing at Boston, in the county of Suffolk and State of Massachusetts, have invented certain new and useful Improvements in Embalming Compounds; and I do declare the following to be a full, clear, and exact description of the invention, such as will enable others skilled in the art to which it appertains to make and use the same.

This invention relates to embalming preparations; and it has for its object to provide an effective preservative and disinfectant composition adapted for distribution to the trade in a condensed pasty form and to be readily and quickly converted into a fluid at the time of use for cavity and arterial embalming; and it consists in compounding the ingredients hereinafter named so as to form a pasty mass, as will be fully described and claimed.

The quantity of fluid required to embalm a body by the methods now commonly employed—*i. e.*, cavity and arterial embalming—is from one-half to two gallons of fluid, which quantities are carried by the embalmers to the place of use in bottles or jugs ready mixed for use. Aside from the fact that the carrying of such large packages is cumbersome and that the liability to breakages thereof in handling the same is very great there is the further disadvantage that the fluid is cold when used and will not perform its function or act as effectively as it would if it were warm. Again, the embalmer is required to purchase the fluid in large quantities if bought from the manufacturers ready for use, which necessitates largely-increased cost owing to increased expenses of transportation and the additional space required for storage and the liability of the fluid to freeze during transportation. Also the fluid is liable to deteriorate in quality if put up in barrels, as is the practice, as well as to a loss by evaporation, which results in an unequal proportion of ingredients at the time it is used.

Now it is the purpose of my invention to obviate the objectionable features above named, and this I accomplish by combining the essential ingredients of a preserving and disinfecting fluid in the form of a paste or pasty mass and storing the same in bottles or other receptacles adapted to be practically air-tight and of a size to contain only a sufficient quantity to provide, when dissolved by the addition of water, preferably heated, the quantity necessary to embalm a body the addition of the water being made at the time the fluid is to be used, so that the latter may be injected while warm and at the time of its most effective strength.

In carrying out my invention I compound boracic acid, two and one-quarter ($2\frac{1}{4}$) ounces, and formalin, five (5) fluid ounces in forty-per-cent. solution, formed into a mass of the consistency of paste. To these may, and preferably will, be added sulfate of zinc, one-half ($\frac{1}{2}$) ounce, glycerin, one-quarter ($\frac{1}{4}$) fluid ounce; creosote, five (5) minims; eucalyptus, either dry or fluid, one-quarter ($\frac{1}{4}$) ounce; and alcohol, two (2) fluid ounces, with a trace of bergamot and a trace of carmine, the whole being thoroughly compounded to form a paste of a consistency which will permit of its being decanted. It will be understood that the term "formalin," as used herein, is intended to cover formic aldehyde in solution or loosely combined.

In preparing the composition the ingredients of a dry form are first thoroughly mixed and compounded, and then the liquid ingredients are added and mixed, so as to form a pasty mass. The composition thus prepared is then bottled, preferably in large-mouthed bottles, and sealed with a stopper, preferably of glass set in wax, so as to render the same air-tight. The boracic acid appears to act to cause the formalin to retain its gases until they are released or liberated by the action of the heated water, which is added at the time the preparation is to be used, thus insuring the full benefit of the action of the gas when the fluid is injected into the body. Where the water is added to the composition at a time long previous to the time of its use, as is now the practice, the gas is immediately liberated and a quantity escapes, thus rendering the fluid much less effective when it is injected into the body. The boracic acid and formalin alone when combined provides a preserving and disinfecting fluid when water is added which will effectively embalm a body. The addition of sulfate of zinc will further aid in arresting putrefaction; but its use is not essential to the preparation. The addition of glycerin renders the composition more soluble and also serves to bind the ingredients and make the preparation more penetrative, as well as adding to its preserving and disinfecting properties; but it may be omitted without destroying the effectiveness of the preparation. The creosote, possessing in the highest degree antiseptic and antiputrefactive properties, aids in the preservation of the qualities contained in the other ingredients, as well as in the preservation of the body, and tends to bleach or whiten the skin and to remove discolorations therefrom, and while a desirable ingredient it is not an absolute essential. The ingredients eucalyptus and alcohol may be added to the compound, as stated, the former for its deodorizing and disinfecting properties and the latter for its solvent properties. The bergamot and carmine are used merely to give odor and color to the preparation, and any other perfume or coloring-matter may be used, if desired.

What I claim as new, and desire to secure by Letters Patent, is—

1. A composition for use in embalming consisting of boracic acid and formalin combined substantially in the proportions described to form a paste.

2. A composition for use in embalming containing boracic acid, glycerin, formalin, and creosote combined substantially in the proportions described to form a paste.

3. A composition for use in embalming containing boracic acid, formalin, creosote, sulfate of zinc, and glycerin, combined substantially in the proportions described to form a paste.

4. A composition for use in embalming containing boracic acid, glycerin, formalin, creosote, and suitable perfuming, and coloring-matter, combined substantially in the proportions described to form a paste.

5. A composition for use in embalming composed of boracic acid, formalin, and glycerin, combined substantially in the proportions described to form a paste.

6. A composition for use in embalming composed of boracic acid, sulfate of zinc, glycerin, creosote, formalin, eucalyptus, alcohol, bergamot, and carmine, combined substantially in the proportions described to form a pasty mass.

In testimony whereof I affix my signature in presence of two witnesses.

GEORGE B. DODGE.

Witnesses:
 DANL. F. HALL,
 CHARLES LOWELL HOWARD.